(12) United States Patent
Tietsch et al.

(10) Patent No.: US 10,158,604 B2
(45) Date of Patent: *Dec. 18, 2018

(54) METHOD FOR ADDRESSING MESSAGES IN A COMPUTER NETWORK

(71) Applicant: Unify GmbH & Co. KG, Munich (DE)

(72) Inventors: Michael Tietsch, Kaufering (DE); Christian Correll, Munich (DE); Heinrich Haager, Vienna (AT)

(73) Assignee: Unify GmbH & Co. KG, Munich (DE)

( * ) Notice: Subject to any disclaimer, the term of this patent is extended or adjusted under 35 U.S.C. 154(b) by 178 days.

This patent is subject to a terminal disclaimer.

(21) Appl. No.: 15/189,397

(22) Filed: Jun. 22, 2016

(65) Prior Publication Data

US 2016/0301659 A1 Oct. 13, 2016

Related U.S. Application Data

(63) Continuation of application No. 13/978,434, filed as application No. PCT/EP2011/001657 on Apr. 1, 2011, now Pat. No. 9,401,892.

(51) Int. Cl.
*H04L 29/12* (2006.01)

(52) U.S. Cl.
CPC ...... *H04L 61/251* (2013.01); *H04L 29/12358* (2013.01); *H04L 29/12443* (2013.01);
(Continued)

(58) Field of Classification Search
CPC ............... H04L 61/251; H04L 61/6086; H04L 61/2542; H04L 61/1529; H04L 29/12443;
(Continued)

(56) References Cited

U.S. PATENT DOCUMENTS

| | | | |
|---|---|---|---|
| 6,690,669 B1 * | 2/2004 | Tsuchiya | H04L 12/66 370/392 |
| 6,708,219 B1 * | 3/2004 | Borella | H04L 12/4633 709/230 |

(Continued)

FOREIGN PATENT DOCUMENTS

| | | |
|---|---|---|
| CN | 101292501 A | 10/2008 |
| CN | 101692647 A | 4/2010 |
| CN | 101978741 A1 | 2/2011 |

OTHER PUBLICATIONS

Written Opinion of the International Searching Authority for PCT/EP2011/001657 dated Mar. 6, 2012 (Form PCT/ISA/237) (German Translation).

(Continued)

*Primary Examiner* — Esther B. Henderson
*Assistant Examiner* — Ronak Patel
(74) *Attorney, Agent, or Firm* — Buchanan Ingersoll & Rooney PC

(57) ABSTRACT

In a method for addressing messages in a computer network in which two different types of address are used, wherein at least one first network element (4, 5, 6, 7, 8) uses exclusively a first type of address, at least one second network element (14, 15, 16, 17, 18) uses exclusively a second type of address and at least one third network element (9, 10, 11, 12, 13, 14) uses both types of address, at least one third network element (9) is a communication terminal which, besides its function as a communication terminal, also performs a function as an address converter for messages for which said communication terminal is neither the original sender nor an ultimate recipient.

20 Claims, 4 Drawing Sheets

(52) U.S. Cl.
CPC .... *H04L 29/12971* (2013.01); *H04L 61/1529*
(2013.01); *H04L 61/2542* (2013.01); *H04L*
*61/6086* (2013.01); *H04L 29/12094* (2013.01)

(58) Field of Classification Search
CPC ......... H04L 29/12358; H04L 29/12971; H04L 29/12094
See application file for complete search history.

(56) References Cited

U.S. PATENT DOCUMENTS

| | | | |
|---|---|---|---|
| 7,324,498 B2 | 1/2008 | Ahn et al. | |
| 7,391,768 B1* | 6/2008 | Samprathi | H04L 29/12358 370/389 |
| 7,526,562 B1* | 4/2009 | Samprathi | H04L 29/12066 370/466 |
| 7,764,680 B2 | 7/2010 | Matsumoto et al. | |
| 7,940,697 B2 | 5/2011 | Savolainan et al. | |
| 8,194,553 B2 | 6/2012 | Liang et al. | |
| 8,228,861 B1* | 7/2012 | Nix | H04W 36/00 370/329 |
| 8,300,637 B1* | 10/2012 | Bennett, III | H04L 61/2015 370/389 |
| 8,417,769 B2* | 4/2013 | Nagoya | H04L 12/66 370/352 |
| 2002/0004721 A1 | 1/2002 | Cha et al. | |
| 2002/0186686 A1* | 12/2002 | Chen | H04L 12/64 370/352 |
| 2003/0118002 A1* | 6/2003 | Bradd | H04L 29/12009 370/352 |
| 2004/0179536 A1* | 9/2004 | Thubert | H04L 29/06 370/395.52 |
| 2004/0184465 A1* | 9/2004 | Lee | H04L 29/12311 370/400 |
| 2004/0233916 A1* | 11/2004 | Takeuchi | H04L 29/12066 370/395.54 |
| 2004/0243720 A1 | 12/2004 | Haumont et al. | |
| 2006/0015590 A1* | 1/2006 | Patil | H04L 63/08 709/220 |
| 2006/0029081 A1* | 2/2006 | Yan | H04L 29/12009 370/395.52 |
| 2006/0165062 A1* | 7/2006 | Nishida | H04L 29/06 370/352 |
| 2006/0173964 A1* | 8/2006 | Oohama | H04L 29/12009 709/206 |
| 2007/0286161 A1* | 12/2007 | Croak | H04L 29/06027 370/352 |
| 2008/0080519 A1* | 4/2008 | Park | H04L 29/12066 370/395.54 |
| 2008/0273461 A1* | 11/2008 | Liang | H04L 47/10 370/235 |
| 2009/0141705 A1 | 6/2009 | Mosker | |
| 2009/0161590 A1 | 6/2009 | Lewis et al. | |
| 2009/0180476 A1* | 7/2009 | Lee | H04L 29/06027 370/392 |
| 2009/0248800 A1* | 10/2009 | Chu | H04L 29/12216 709/204 |
| 2009/0285175 A1* | 11/2009 | Nix | H04L 29/125 370/331 |
| 2007/0323632 | 12/2009 | Nix | |
| 2009/0316684 A1* | 12/2009 | Buckley | H04L 29/12349 370/352 |
| 2009/0319691 A1* | 12/2009 | Buckley | H04L 29/12349 709/245 |
| 2009/0323632 A1* | 12/2009 | Nix | H04L 29/125 370/331 |
| 2010/0287227 A1* | 11/2010 | Goel | H04L 67/1002 709/202 |
| 2010/0293297 A1* | 11/2010 | Perumal | H04L 29/12528 709/245 |
| 2011/0019677 A1* | 1/2011 | Townsley | H04L 29/12358 370/401 |
| 2011/0153827 A1* | 6/2011 | Yengalasetti | G06F 9/5044 709/226 |
| 2011/0154432 A1* | 6/2011 | Basavaraj | H04L 63/105 726/1 |
| 2011/0249636 A1* | 10/2011 | Cherian | H04L 29/12801 370/329 |
| 2012/0082158 A1* | 4/2012 | Reddy | H04W 80/045 370/389 |
| 2013/0070770 A1* | 3/2013 | Zha | H04L 12/4633 370/392 |
| 2013/0282924 A1* | 10/2013 | Tietsch | H04L 29/12358 709/245 |

OTHER PUBLICATIONS

International Search Report for PCT/EP2011/001657 dated Mar. 6, 2012 (Forms PCT/ISA/220, PCT/ISA/210) (German Translation).
Fritz! Box Fan WLAN 7270—Product Flyer, pp. 1-2, Internet, Feb. 1, 2009.
Integrating Voice Over IP Services in IPv4 and IPv6 Networks, Computing in the Global Information Technology, Lambros Lambrinos et al., pp. 54-59, Mar. 1, 2007.
SIP and IPv6: Why and How?, Applications and the Internet Workshops, Dorgham Sisalem, et al., 2003.
Scalable NAT-PT Solution, Daniel Park Samsung Electronics, Sivakumar, et al., Mar. 13, 2005.
International Preliminary Report on Patentability and Written Opinion for PCT/EP2011/001657 dated Oct. 2, 2013 (German Translation).
International Preliminary Report on Patentability and Written Opinion for PCT/EP2011/001657 dated Oct. 2, 2013 (English Translation).

* cited by examiner

METHOD FOR ADDRESSING MESSAGES IN A COMPUTER NETWORK

CROSS-REFERENCE TO RELATED APPLICATIONS

This application is a continuation application of U.S. patent application Ser. No. 13/978,434, which is the United States National phase under 35 U.S.C. § 371 of PCT International Application No. PCT/EP2011/001657, filed on Apr. 1, 2011.

BACKGROUND OF THE INVENTION

Field of the Invention

Embodiments of the invention relate to methods for addressing messages in a computer network.

Background of the Related Art

With increasing numbers of participants on computer networks, the address types in such computer networks can reach capacity limits, making it necessary to convert to different address types. An example of this is the conversion of addressing on the Internet from IPv4 addressing to IPv6 addressing. Almost immediately, more and more (sub-) networks are having to be converted to IPv6 addressing, because the latest estimates are that already next year there will be no more new IPv4 addresses available.

On the other hand, however, both IPv4 and IPv6 addresses and corresponding sub-networks will still coexist for many years. Given the large number of existing installations, it will be several years, possibly ten or even twenty years, before the last IPv4 network elements are switched off. During this switchover period, both address types will have to be used together. For some services, such as voice and video (VVoIP) services based on the Session Initiation Protocol, there are already converters between the two address types, which are often in the form of a Session Border Controller (SBC) with an integrated Media Gateway (MGW).

IPv4 offers addressing space for a little over four billion IP addresses ($2^{32}$=4,294,967,296) for addressing computers and other devices. In the early stages of the Internet, when there were only a few computers that needed an IP address, this was more than sufficient. Due to the unforeseen growth of the Internet, however, today there is a shortage of addresses. On Feb. 1, 2011, IANA allocated the last two unreserved networks to the Asian Regional Internet Registry APNIC; according to an agreement from 2009, the remaining address space was distributed equally to the regional address assignment authorities on Feb. 3, 2011. Beyond that, the regional address assignment authorities no longer have any IPv4 address space available to them. A prognosis from the chief scientists at APNIC, which is updated daily, shows that the first Regional Internet Registry, APNIC, will have no more addresses available for the Internet community as of July 2011.

The historic development of the Internet poses another problem: due to the fact that the practice of assigning IPv4 address space changed several times over time, it became highly fragmented, so that often a number of non-related address ranges belong to the same organization. Combined with the routing strategy used today (Classless Inter-Domain Routing), this leads to long routing tables, to which storage devices and processors for routers in the core area of the Internet must be configured. Furthermore, IPv4 requires routers to re-calculate checksums for each forwarded packet, adding to the processor load.

For these reasons, the IETF started work on IPv6 in 1995. In December 1998, with the publication of RFC 2460 in the Standards Track, IPv6 was officially named as the successor to IPv4.

The significant new features of IPv6 include:
a) An increase in address space from IPv4 with $2^{32}$ (~4.3 billion=4.3·$10^9$) addresses to $2^{128}$ (~340 undecillion=3.4·$10^{38}$) addresses with IPv6, i.e. increased by a factor of $2^{96}$
b) Simplification and improvement of the protocol structure (header data); this is especially important for routers.
c) Automatic classless configuration of IPv6 addresses; classful processes like DHCP are therefore unnecessary when using IPv6 in many application situations
d) Mobile IP as well as simplified renumbering and multi-homing
e) Implementation of IPsec within the IPv6 standard. This makes it possible to encrypt IP packets and check them for authenticity. For IPv4, IPsec support is only optional.
f) Support of network techniques such as Quality of Service and Multicast.

The primary motivation for increasing address space lies in preserving the end-to-end principle, which is a central design principle of the Internet: Only the end nodes of the network should conduct active protocol operations, and the network between the end nodes is only responsible for forwarding data packets. (In this regard, the Internet differs significantly from other digital data transfer networks such as GSM.) This makes it necessary for every network node to be addressable in a globally unique manner.

Today's commonly used methods such as Network Address Translation (NAT), which at present bypass the IPv4 address shortage, violate the end-to-end principle. They make it possible for connected computers to generate only outgoing connections, so they cannot be contacted readily from the Internet. Also IPsec or higher-layer protocols like FTP and SIP rely in part on the end-to-end principle and have only limited functionality with NAT or require additional solutions. Especially for home users, IPv6 implies a paradigm shift: Instead of being assigned just one IP address from the provider and having to link multiple devices to the Internet through NAT, the user receives a globally unique IP address space available for an entire sub-network, so that each of his devices can have an IP address on that sub-network. This makes it easier for end users to participate actively on the network by offering services, and it eliminates the problems resulting from NAT address transcription.

BRIEF SUMMARY OF THE INVENTION

According to embodiments of the invention, a method for addressing messages in a computer network, in which different address types are used and at least one first network element uses only one first address type, at least one second network element uses only one second address type, and at least one third network element uses both address types. Here, at least one third network element is a communication terminal which, in addition to its function as a communication terminal, also functions as an address converter with respect to messages for which this communication terminal is neither the original sender nor a final recipient.

DETAILED DESCRIPTION OF THE INVENTION

Figure 1:
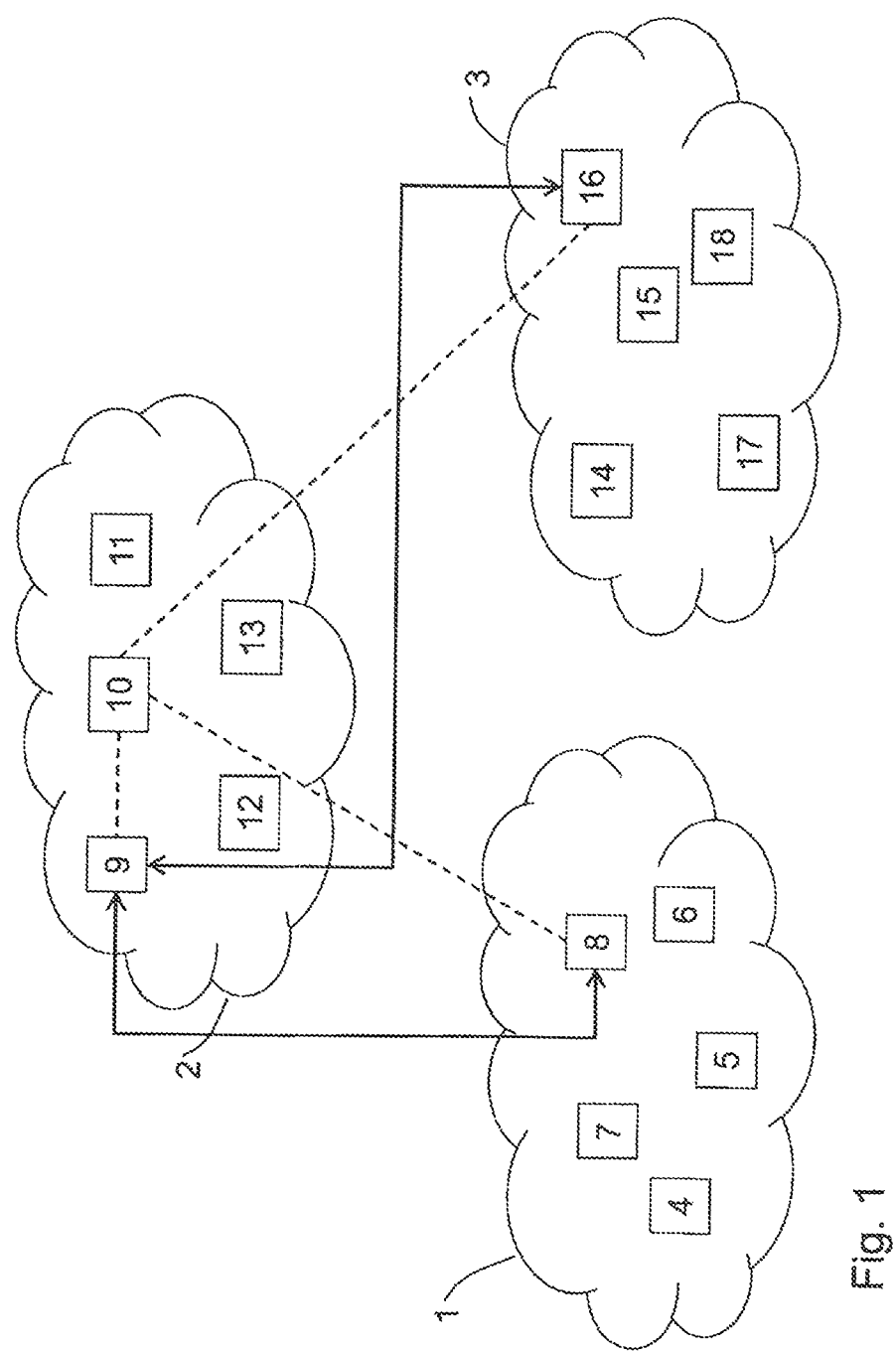
FIG. 1: schematically, a first embodiment of the invention.

As previously noted, we provide a method for addressing messages in a computer network, in which different address types are used and at least one first network element uses only one first address type, at least one second network element uses only one second address type, and at least one third network element uses both address types. Here, at least one third network element is a communication terminal which, in addition to its function as a communication terminal, also functions as an address converter with respect to messages for which this communication terminal is neither the original sender nor a final recipient.

In this regard, a computer network is understood to mean a network on which messages are exchanged between network elements using addresses. An important example of such a computer network is the Internet, on which messages in packet form are exchanged between network elements using IP addresses.

Other important examples of computer networks with respect to the preceding description are modern telephone systems. Modern telephone systems perform these tasks using IP (Internet Protocol) technology, where the individual terminals are no longer connected to the telephone system with wiring, but rather are connected in a data network like PCs (personal computers). In IP networks, the payload (generally digitized voice data) is assembled in data packets and given a sender address and a target address, and the network infrastructure uses that target address to send the data packet to the terminal.

The IPv4 (Internet Protocol Version 4) normally used for this offers an address space for $2^{32}$ (=4,294,976,296) possible addresses, which today is already almost used up. The further development of IPv4, called IPv6 and intended to resolve this limitation, offers a significantly larger address space for $2^{128}$ potential addresses. IPv6 is standardized in "Internet Protocol, Version 6 Specification; RFC2460 of the IETF (Internet Engineering Task Force). Connecting (sub-) networks, each having a different Internet protocol (IPv4 and IPv6), creates problems that are solved in the SIP environment, according to the current state of the art, by the ICE protocol (ICE: Interactive Connectivity Establishment), wherein all participating terminals must be capable of working according to the ICE protocol and a central server that can be reached by all participating terminals must handle the forwarding of payload data. The disadvantage with this is that the ICE protocol must be used in all participating terminals, which may require expensive changes to the control software of every device.

EL MALKI, Karim [et al.]: "IPv6-IPv4 Translation mechanism for SIP-based services in Third Generation Partnership Project (3GPP) Networks. Network Working Group", Internet Draft, December 2003, discloses a method for bidirectional address conversion in SIP-controlled data streams between IPv6-enabled data terminals and IPv4-enabled data terminals. In this regard, a network element is understood to mean a device capable of sending and/or receiving messages in a computer network. Examples of network elements are communication terminals, such as Internet telephones, computers, routers, switches, and other network elements required or suitable for operating a computer network.

In this regard, a communication terminal is understood to mean a network element whose primary purpose is to allow a subscriber to communicate via a computer network, and in particular for this subscriber to send and receive messages on this computer network. Important examples of communication terminals are Internet telephones, computers, especially notebooks, smartphones, and similar devices.

In this regard, an address converter should be understood to mean a network element that is equipped to receive messages and to convert the addresses of received messages in such a way that addresses of one address type are changed to addresses of another address type. Address converters therefore allow a subscriber whose communication terminal can handle only one first address type to send messages to other communication terminals that can handle only the respective other address type or another address type.

During data packet transmission using a communication terminal functioning as an address converter, all participating data terminals send data packets to the (compatible) addresses provided to them during the signaling process as the connection was being initiated (IP addresses, for example), wherein a communication terminal functioning as an address converter receives these data packets, performs the corresponding exchange processes (IPv4 addresses with IPv6 addresses and vice versa), and sends the data packets to the respective receiving data terminals (located in their respective other IP protocol areas, for example). The invented method allows, for example, a transparent data transfer between IPv4- and IPv6-enabled data terminals.

According to one preferred embodiment of this invention, the address conversion takes place in such a way that messages from a first network element to a second network element or from a second network element to a first network element are directed through a communication terminal functioning as an address converter, wherein addresses of the first address type are changed to addresses of the second address type or vice versa. It is particularly preferable that this be done in such a way that the address portion of a message being received by a communication terminal functioning as an address converter is removed and exchanged for, i.e., replaced by, an address portion of another address type.

The communication terminal functioning as an address converter works preferably in parallel as both an address converter and a communication terminal. Therefore, such a communication terminal is preferably equipped with resources capable of address conversion or that enable or support address conversion, such as a storage memory for addresses, a comparator for comparing addresses, or other such devices. Some of these devices are already available anyway in a communication terminal that supports addresses of more than one address type, but according to the invention are used simply in other ways, such as for address conversion.

An example of this is any component of such a communication terminal that supports processing of more than one address type. If, for example, addresses of a second address type are longer than addresses of a first address type, i.e., the addresses of the second address type have a greater number of bits than the addresses of the first address type, then the storage and processing components for addresses in such communication terminals must be adapted to this situation. For example, IPv6 addresses are 128 bits long, while IPv4 addresses are only 32 bits long.

Another preferred embodiment of the invention, whose features can also be combined with features of other embodiments, provides for a method in which at least one third network element, to which the transmission-related conditions of at least one communication element functioning as an address converter are known, searches on the computer network for a communication terminal that is capable of and configured for address conversion and forwards messages to that communication terminal for address conversion. This third network element, to which the transmission-related conditions of at least one communication element functioning as an address converter are known, preferably consists of an active transmission-related network element, such as a switch or router, to which the transmission-related conditions of some or even many communication terminals are preferably known and which especially knows which of the communication terminals managed or operated by it can function as address converters. Preferably, this third network element searches among the multiple communication terminals known to it for a suitable communication terminal, which can function as an address converter and is configured for that purpose, wherein "ready" status is based primarily on the communication terminal's use of resources.

Another preferred embodiment of the invention, whose features can also be combined with features of other embodiments, provides for a method in which searching for a communication terminal capable of addressing finds information about the availability of the resources needed for address conversion for at least one communication terminal functioning as an address converter.

According to another preferred embodiment of the invention, whose features can also be combined with features of other embodiments, address conversion is done by a communication terminal only when, or not until, at least one dedicated address converter in the computer network reaches its capacity limits. This embodiment offers the advantage that the resources of communication terminals capable of address conversion are used only when necessary, which is generally related to the advantage that faster-operating dedicated address converters can be used for faster address conversion.

Embodiments further concern a communication terminal in a computer network in which two different address types are used, wherein at least one first network element uses only a first address type, at least one second network element uses only a second address type, and at least one third network element uses both address types, and wherein the communication terminal is such a third network element, equipped such that, in addition to its function as a communication terminal, it can also function as an address converter with respect to messages for which this communication terminal is neither the original sender nor the final recipient.

A preferred embodiment of the invention provides for a communication terminal equipped such that, during the address conversion for messages from a first network element to a second network element or from a second network element to a first network element that are directed through that communication terminal that is functioning as an address converter, addresses of the first address type are changed to addresses of the second address type or vice versa.

According to another preferred embodiment of the invention, whose features can also be combined with features of other embodiments, the communication terminal is equipped such that information about the availability of its resources required for address conversion are available to at least one other network element, preferably upon request.

According to another preferred embodiment of the invention, whose features can also be combined with features of other embodiments, the communication terminal has a device that recognizes messages that have been or are being forwarded to that communication terminal for address conversion.

According to another preferred embodiment of the invention, whose features can also be combined with features of other embodiments, the communication terminal has a device for recognizing messages that have been or are being forwarded to that communication terminal for address conversion, wherein that device compares the address for each message received by that communication terminal with the address of that communication terminal.

According to another preferred embodiment of the invention, whose features can also be combined with features of other embodiments, the communication terminal has an address conversion device configured such that the address of each message received by that communication terminal that does not match the address of that communication terminal is replaced by an address of the first or second address type, if the address of the received message is an address of the second or first address type.

According to another preferred embodiment of the invention, whose features can also be combined with features of other embodiments, the communication terminal is equipped such that a received message whose address has been replaced by an address of the other address type is sent out into the computer network with that address.

The invention is described below in more detail, based on preferred exemplary embodiments and with reference to the figures.

The embodiments shown in the figures illustrate exclusively methods for addressing messages in a computer network 1, 2, 3, which consists of sub-networks 1, 2, 3 in which different address types such as IPv4 addresses and IPv6 addresses are used, wherein in sub-network 1 only one first address type, in sub-network 3 only a second address type, and in sub-network 2 both address types are used. The network elements 4, 5, 6, 7, 8 of sub-network 1 can handle only addresses of a first address type, the network elements 14, 15, 16, 17, 18 can handle only addresses of a second address type, and the network elements 9, 10, 11, 12, 13 can handle address of both address types. The sub-networks 1, 2, and 3 need not be physically separated from each other, spatially or in any other way. The sub-networks 1, 2, 3 preferably make up an otherwise consistent computer network that includes different types of network elements that can handle either only a first address type, only a second address type, or both address types.

The invention is not limited to the case of a computer network in which only two address types are used together. The invention can be used in the same way if three or more different address types are used together on a computer network.

FIG. 1 shows an embodiment in which a communication connection is to be established between a network element 8, such as a communication terminal 8, and a network element 16, such as a communication terminal 16, through a network element 10, such as a switch 10, wherein the network element 8 can handle only addresses of the first address type, the network element 16 can handle only addresses of the second address type, and the network element 10 can handle both address types. The network element 10 now recognizes that a direct communication connection between the network elements 8 and 16 cannot be readily established, due to the different address types that these two network elements use exclusively. In the embodiment illustrated in FIG. 1, the network element 10 now chooses the communication terminal 9, which is capable of and configured for address conversion, and instructs it to perform an address conversion between the network elements 8 and 16. To do this, the network element 10 instructs the network element 8 to send the messages intended for the network element 16 to the communication terminal 9, for which the network element 8 uses addresses of the first address type, which are handled without difficulty by the communication terminal 9. The communication terminal 9 now replaces the addresses of the first address type, used in the messages received by it from the network element 8, with addresses of the second address type that address the network element 16, which is actually designated as the recipient of the messages and can handle only addresses of the second address type. After that, the communication terminal 9 forwards the changed messages appropriately to the network element 16.

Figure 2:
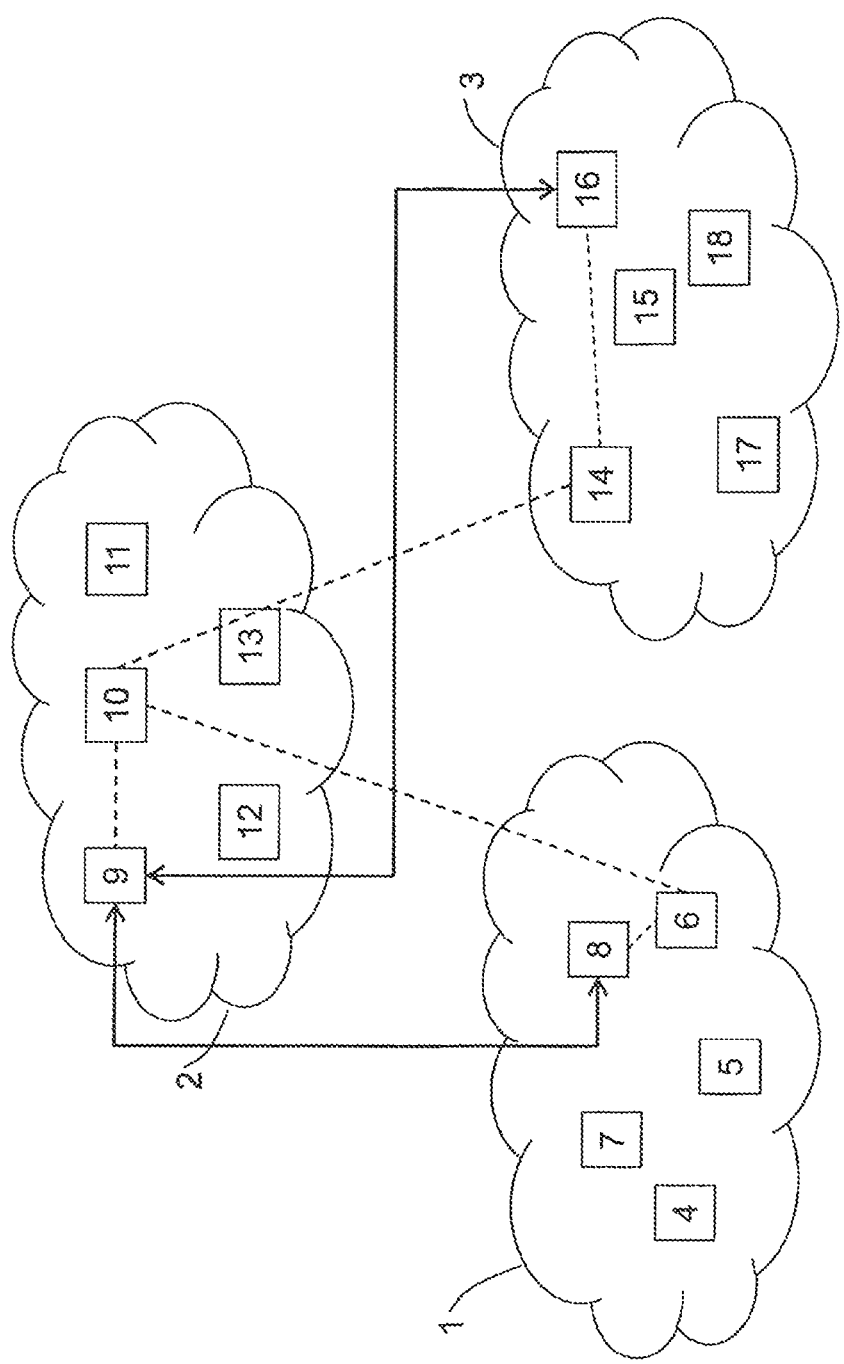
FIG. 2: schematically, a second embodiment of the invention.

In the embodiment illustrated in FIG. 2, the sub-network 1 has its own switch 6 that can handle only addresses of the first address type. In a similar fashion, the sub-network 3 has a switch 14 that can handle only addresses of the second address type. The connection between the communication terminals 8 and 16 is established in this case through the switches 6 and 14 in the sub-networks 1 and 3 respectively. They notify the switch 10 in the sub-network 3, which can handle both address types, of the desire to establish a connection, at which point that switch 10 establishes the connection between the communication terminals 8 and 16 using the communication terminal 9 functioning as an address converter, in the same way as in the embodiment shown in FIG. 1.

Figure 3:
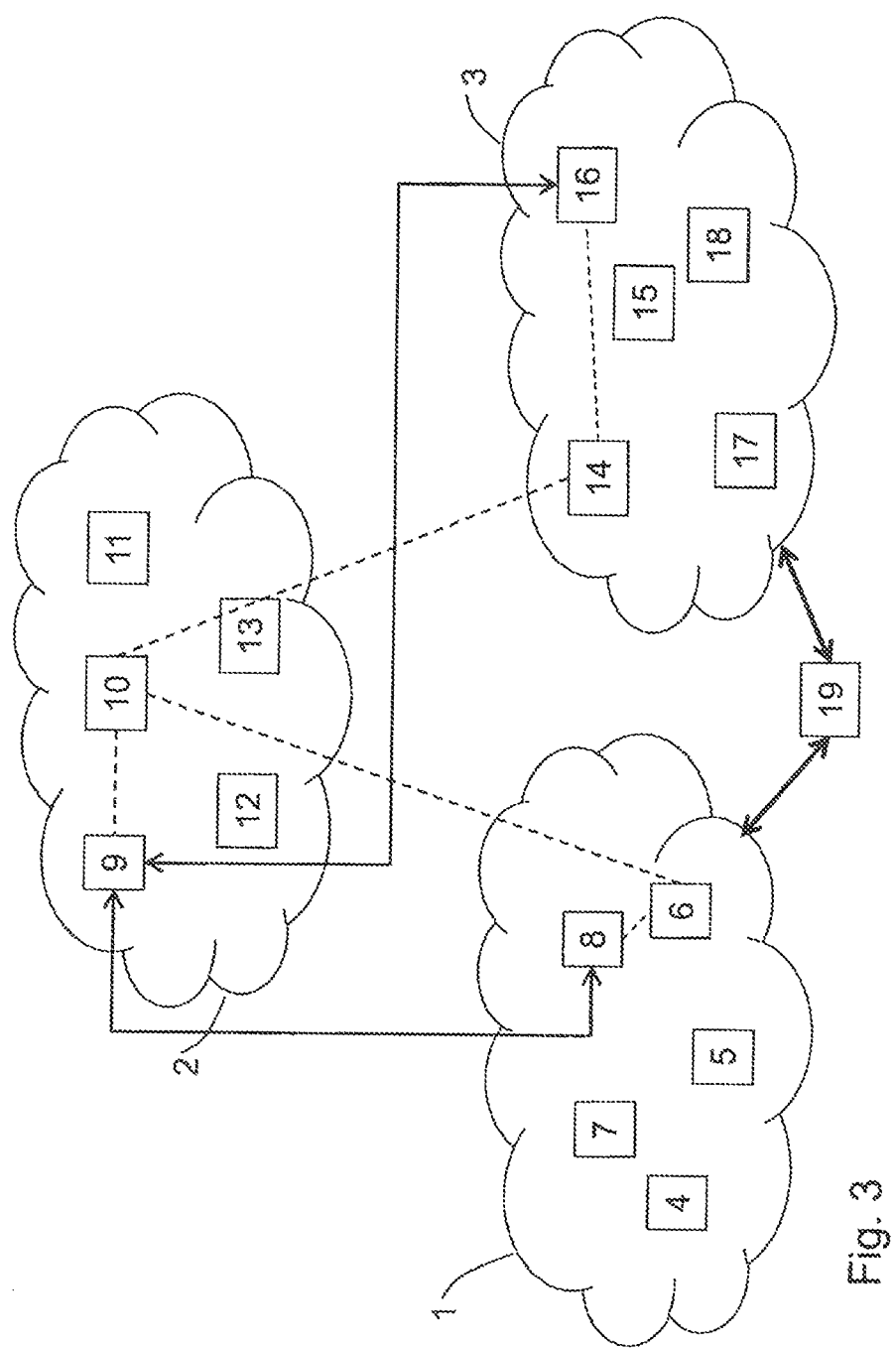
FIG. 3: schematically, a third embodiment of the invention.

Another embodiment, shown in FIG. 3, is based on the fact that there is a dedicated, preferably central address converter 19 between sub-networks 1 and 3. Assuming that this dedicated address converter can handle one hundred connections at the same time and the need now increases to one hundred ten connections, it would be possible in principle to add another dedicated address converter, which in this example would generate the unnecessary capacity of two hundred connections, with the related costs. The invention, by means of the embodiment shown in FIG. 3, makes it possible to establish the additional ten connections through communication terminals functioning as address converters in sub-network 2, with little or no additional related expense.

The communication terminals capable of address conversion according to this invention are preferably implemented as "dual stack" devices, wherein these devices are enabled to decide by themselves, depending on the respective communication partner, for example, which address types to use, such as IPv4 or IPv6. The most common operating mode for such devices, with which the addresses for both IP versions are configured and made usable, is called Dual IP. An operating network consisting of devices in Dual IP mode is therefore called a Dual IP network.

Because devices operating in Dual IP can communicate with partners in both IPv4 and IPv6 networks, such devices can in principle function as address converters if configured for that purpose.

In the illustrative case of a VVoiP scenario using the Session Initiation Protocol (SIP), typically the already existing transmission nodes operating in Dual IP (IP softswitches) perform an additional management function, namely that of a resource broker.

In the switch, the transmission-related conditions (in the simplest case: "free"/"busy") for the terminals it controls are known. If a payload connection is to be made now between communication terminals with different address types through an address converter, the resource broker will preferably search for an appropriate—for example, free—communication terminal that can function as an address converter and is prepared to do so, and will establish the payload connection for address conversion through that communication terminal. If a particular communication terminal capable of address conversion is needed for something else, e.g., by its communication participant for a telephone call, and if its resources do not allow both tasks to take place at the same time, the payload connection is preferably made dynamically through another communication terminal that is capable of address conversion and can be instructed to perform that task. The likelihood of needing such a dynamic diversion of a connection with address conversion can advantageously be reduced if, when the communication terminal to be used for address conversion is chosen, certain automatically-collected statistical data are used, such as the usual working hours of the communication participants who use that communication terminal or statistics about call frequency related to the time of day, day of the week, etc.

Figure 4:
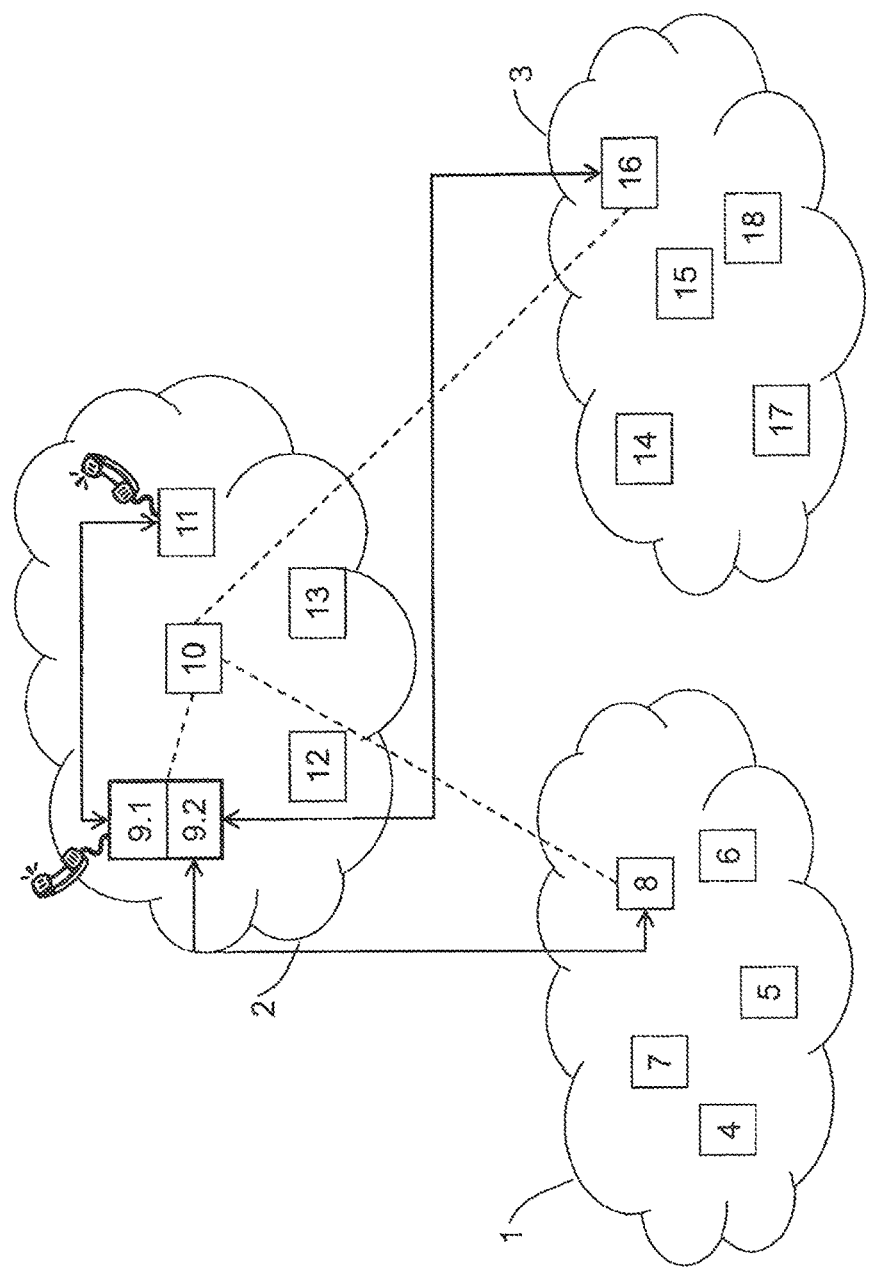
FIG. 4: schematically, a fourth embodiment of the invention.

In FIG. 4, the double function of the communication terminal 9 shown in FIGS. 1, 2, and 3, working as both a communication terminal and an address converter, is emphasized by showing it as a double device with the two parts 9.1 and 9.2. Part 9.1 represents the classic terminal function—symbolized by a telephone receiver—in which, for example, a call is initiated or answered, shown by the example of a connection to the communication terminal 11. The second part of the device, designated as 9.2, supports a connection that is independent of part 9.1 and is routed through the device 9, specifically through its part 9.2 for the purpose of address conversion only. Although, in this regard, "device parts" 9.1 and 9.2 are mentioned separately for ease of description, this should not be taken to mean that a communication terminal 9 that is capable of functioning as an address converter must necessarily consist of two physically separate parts 9.1 and 9.2. What is meant here is at least a logical or functional separation, by means of which the same resources can be used together by both "parts," provided that this joint use of resources does not impair either of the two different functions.

The dotted lines in FIGS. 1, 2, 3, and 4 designate control or signaling processes, and the solid lines with arrows designate existing or intended payload connections. The address conversion function of the participating communication terminals is preferably controlled by a network element functioning as a resource broker. The invention also offers the advantage that available but currently unused resources in communication terminals that can be used for address conversion between IPv4 and IPv6 addresses, for example, are actually used by the invention, thereby allowing the invention to efficiently solve an Internet problem that has been troubling until now.

What is claimed is:

1. A communication system comprising:
a first communication terminal communicatively connectable to a second communication terminal,
the first communication terminal configured to at least one of:
initiate a telephone call directed toward a user, and
answer a telephone call directed to a user of the first communication terminal and participate in that telephone call; and
the first communication terminal configured to respond to receipt of a first message from a third communication terminal that is directed toward the second communication terminal by converting an address of the first message from a first address type to a second address type that is different than the first address type and sending the first message having the converted address to the second communication terminal.

2. The system of claim 1, wherein the first communication terminal is configured to answer the telephone call and participate in the telephone call while the first communication terminal also converts the address of the first message and sends the first message having the converted address to the second communication terminal.

3. The system of claim 1, wherein the first address type is an address compliant with one of Internet Protocol Version 4 (IPv4) and Internet Protocol Version 6 (IPv6) and the second address type is compliant with the other of IPv4 and IPv6.

4. The system of claim 1, wherein the first communication terminal is configured to receive a communication from a switch relating to establishment of a communication connection between the second and third communication terminals via the first communication terminal.

5. The system of claim 1, wherein the first communication terminal is a dual stack device.

6. The system of claim 1, wherein the first communication terminal is configured to dynamically divert a connection between the second and third communication terminals that is formed via the first communication to a fourth communication terminal such that the fourth communication terminal performs address conversions for messages exchanged between the second and third communication terminals after the diversion of the connection to the fourth communication terminal occurs in response to determining that resources of the first communication terminal prevent the first communication terminal from supporting an exchange of payload data between the second and third communication terminals.

7. The system of claim 1, wherein the first communication terminal is configured to facilitate a communication connection to be formed between the second and third communication terminals prior to the first communication terminal performing the converting of the address of the first message.

8. The system of claim 7, comprising the second communication terminal and the third communication terminal.

9. The system of claim 1, comprising the second communication terminal.

10. The system of claim 9, comprising the third communication terminal.

11. The system of claim 1, comprising a switch communicatively connectable to the first communication terminal, the switch configured to assign the first communication terminal to the first message based on collected statistical data relating to at least one of: working hours of a user who is assigned to the first communication terminal, call frequency involving the first communication terminal related to a time of day, and call frequency involving the first communication terminal related to a day of the week.

12. The system of claim 1, wherein the first communication terminal is configured to initiate the telephone call while the first communication terminal is also converting the address of the first message and sending the first message having the converted address to the second communication terminal.

13. A communication apparatus comprising:
a first communication terminal,
the first communication terminal configured to respond to receipt of a first message from a second communication terminal that is directed toward a third communication terminal by converting an address of the first message from a first address type to a second address type that is different than the first address type and sending the first message having the converted address to the third communication terminal.

14. The apparatus of claim 13, wherein the first communication terminal is configured to initiate a telephone call directed toward a user.

15. The apparatus of claim 14, wherein the first communication terminal is configured to answer a telephone call directed to a user of the first communication terminal and participate in that telephone call.

16. The apparatus of claim 15, wherein the first communication terminal is configured to answer the telephone call and participate in the telephone call while the first communication terminal also converts the address of the first message and send the first message having the converted address to the third communication terminal.

17. The apparatus of claim 15, wherein the first communication terminal is configured to initiate the telephone call while the first communication terminal is also converting the address of the first message and sending the first message having the converted address to the third communication terminal.

18. The apparatus of claim 13, wherein the first communication terminal is configured to answer a telephone call directed to a user of the first communication terminal and participate in that telephone call while the first communication terminal also converts the address of the first message and send the first message having the converted address to the third communication terminal.

19. The apparatus of claim 13, comprising a switch, wherein the first communication terminal is configured to receive a communication from the switch relating to establishment of a communication connection between the second and third communication terminals via the first communication terminal.

20. The apparatus of claim 19, wherein the switch is configured to assign the first communication terminal to the communication connection based on collected statistical data relating to at least one of: working hours of a user who is assigned to the first communication terminal, call frequency involving the first communication terminal related to a time of day, and call frequency involving the first communication terminal related to a day of the week.

* * * * *